US012741361B2

(12) United States Patent
Donovan et al.

(10) Patent No.: US 12,741,361 B2
(45) Date of Patent: Sep. 22, 2026

(54) MULTIPURPOSE DRIP IRRIGATION TOOL

(71) Applicant: Husqvarna AB, Huskvarna (SE)

(72) Inventors: Charles Spencer Donovan, Millcreek, UT (US); Eric Tres Wangsgaard, Salt Lake City, UT (US)

(73) Assignee: HUSQVARNA AB (SE)

( * ) Notice: Subject to any disclaimer, the term of this patent is extended or adjusted under 35 U.S.C. 154(b) by 575 days.

(21) Appl. No.: 18/215,400

(22) Filed: Jun. 28, 2023

(65) Prior Publication Data

US 2025/0001573 A1 Jan. 2, 2025

(51) Int. Cl.

| | |
|---|---|
| ***B25F 1/00*** | (2006.01) |
| ***A01G 25/02*** | (2006.01) |
| ***B25B 7/02*** | (2006.01) |
| *B25B 27/10* | (2006.01) |
| *B26F 1/36* | (2006.01) |

(52) U.S. Cl.

CPC ............ *B25F 1/003* (2013.01); *A01G 25/023* (2013.01); *A01G 25/026* (2013.01); *B25B 7/02* (2013.01); *B25B 27/10* (2013.01); *B26F 1/36* (2013.01)

(58) Field of Classification Search

CPC ..... B25F 1/003; A01G 25/023; A01G 25/026; B25B 27/10; B25B 7/02; B26F 1/36; B23B 5/167; B23B 5/168; B05B 15/658; Y10T 29/539

See application file for complete search history.

(56) References Cited

U.S. PATENT DOCUMENTS

| | | | | |
|---|---|---|---|---|
| 276,793 | A | 5/1883 | Erdman | |
| 4,522,339 | A | 6/1985 | Costa | |
| 6,430,767 | B1 * | 8/2002 | Ramos | A01G 25/026 7/125 |
| 6,901,643 | B1 | 6/2005 | Krasner et al. | |
| 7,028,360 | B2 | 4/2006 | Eldar | |
| 9,108,313 | B2 | 8/2015 | Gonzalez | |
| 9,655,310 | B1 * | 5/2017 | Hernstedt | A01G 25/026 |
| 10,071,449 | B1 * | 9/2018 | Donofrio | B26F 1/0015 |
| 10,391,512 | B1 * | 8/2019 | Samuel | B05B 1/202 |
| D1,093,109 | S * | 9/2025 | Valeika | D8/52 |
| D1,095,191 | S * | 9/2025 | Zhu | D8/52 |
| D1,102,857 | S * | 11/2025 | Donovan | D8/55 |

(Continued)

FOREIGN PATENT DOCUMENTS

| | | |
|---|---|---|
| CN | 102179798 A | 9/2011 |
| CN | 101941188 B | 3/2013 |

(Continued)

OTHER PUBLICATIONS

How to attach Orbit micro sprinklers Found at: https://www.youtube.com/watch?v=Z19S7bc-qEI (Year: 2019).*

(Continued)

*Primary Examiner* — Mahdi H Nejad

(74) *Attorney, Agent, or Firm* — AUSTIN RAPP

(57) ABSTRACT

A multipurpose drip irrigation tool may comprise a first reaming extension and a second reaming extension. The first reaming extension may be positioned with respect to the second reaming extension such that a tube of a smaller diameter may be expanded by either one of the first and second reaming extensions and a tube of a larger diameter may be expanded by a combination of the first and second reaming extensions.

13 Claims, 10 Drawing Sheets

(56) References Cited

U.S. PATENT DOCUMENTS

| | | | | |
|---|---|---|---|---|
| 2003/0204957 | A1 | 11/2003 | Eldar | |
| 2017/0197457 | A1* | 7/2017 | Garr | B41F 17/30 |
| 2021/0316370 | A1* | 10/2021 | Herritz | B25G 3/00 |
| 2025/0001573 | A1 | 1/2025 | Donovan et al. | |

FOREIGN PATENT DOCUMENTS

| | | | |
|---|---|---|---|
| CN | 209774852 | U | 12/2019 |
| CN | 215471639 | U | 1/2022 |
| DE | 7720761 | U1 | 11/1977 |
| KR | 101619694 | B1 | 5/2016 |
| WO | 2005113364 | A2 | 12/2005 |
| WO | 2006124677 | A2 | 11/2006 |

OTHER PUBLICATIONS

Notice of Allowance and Fee(s) Due (including a Notice of Allowability for a Design Patent section and an Examiner's Comment section), U.S. Appl. No. 29/895,986, mailed on Jun. 27, 2025 (shown in attachment 1).

U.S. Appl. No. 29/895,986, filed Jun. 28, 2023, Donovan.

Orbit Irrigation Products, LLC, "Pro Series Drip Punch Gun" Part No. 67757, web archive [online brochure], apparently published on or before May 17, 2022 [retrieved from the Internet on Sep. 19, 2023 from: <URL: https://web.archive.org/web/20220517140541/https://www.orbitonline.com/products/pro-series-drip-punch-gun>] (shown in attachment 1).

Amazon, AL-MAGOR Trigger TR-3 Garden Tool: 3 in 1 Multitask Punching Cutting Inserting Sprinklers & Drippers in Irrigation Tube Pipes, 3mm Punch Tip & Sharp Blade for Cutting, Model 350030-P; web page [online catalog], apparently published on or before Apr. 2, 2021 [retrieved from the Internet on Sep. 18, 2023 from: <URL: https://www.amazon.com/AL-MAGOR-Trigger-TR-3-Garden-Tool/dp/B08FBRF1W/ref=cm_cr_arp_d_product_top?ie=UTF8>] (shown in attachment 2).

Amazon, DIG 16-066R Drip Irrigation Barb Insertion Tool; web page [online catalog], apparently published on or before May 19, 2018 [retrieved from the Internet on Sep. 18, 2023 from: <URL: https://www.amazon.com/DIG-16-066R-Drip-Irrigation-Insertion/dp/B01GHERRH6/ref=cm_cr_arp_d_product_top?ie=UTF8>] (shown in attachment 3).

Sprinkler Warehouse; DIG Drip Irrigation Barb Insertion Tool; YouTube video, 25 screen captures from playback times 0:16-0:35 [online] apparently published on or before Aug. 20, 2018 [retrieved from the Internet on Sep. 18, 2023 from: <URL: https://youtu.be/K20H4F8WWCk>] (shown in attachment 4, parts 1-2).

Examiner's Report, Canadian Patent App. No. 225384, mailed Oct. 29, 2024 (Included as attachment 1).

Response to Examiner's Report, Canadian Patent App. No. 225384, dated Jan. 29, 2025 (Included as attachment 2).

* cited by examiner

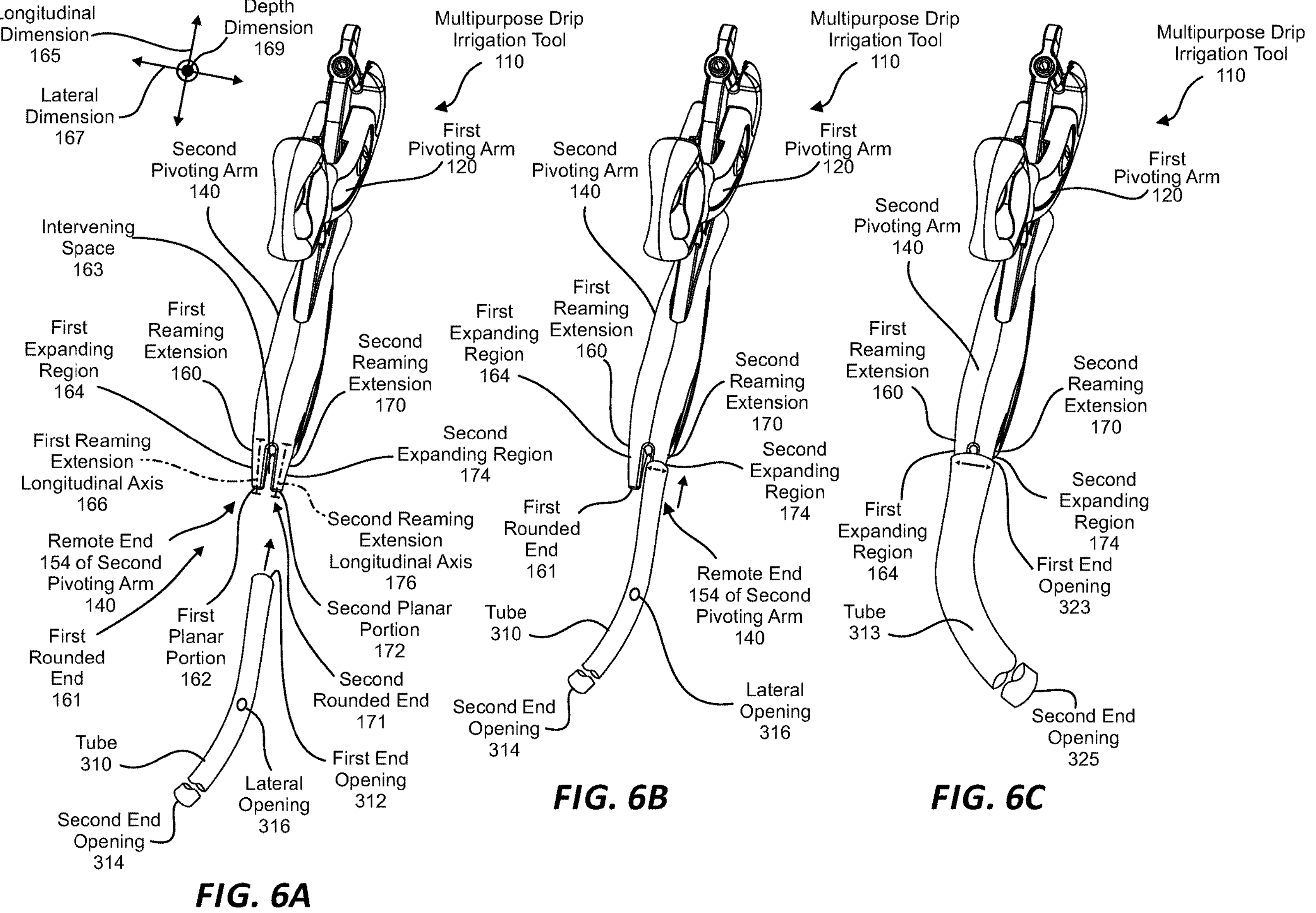
Longitudinal Dimension 165
Depth Dimension 169
Lateral Dimension 167
Multipurpose Drip Irrigation Tool 110
First Pivoting Arm 120
Second Pivoting Arm 140
Intervening Space 163
First Expanding Region 164
First Reaming Extension 160
Second Reaming Extension 170
First Reaming Extension Longitudinal Axis 166
Second Expanding Region 174
Second Reaming Extension Longitudinal Axis 176
Remote End 154 of Second Pivoting Arm 140
First Rounded End 161
First Planar Portion 162
Second Planar Portion 172
Second Rounded End 171
Tube 310
Lateral Opening 316
First End Opening 312
Second End Opening 314
FIG. 6A
Multipurpose Drip Irrigation Tool 110
First Pivoting Arm 120
Second Pivoting Arm 140
First Reaming Extension 160
First Expanding Region 164
Second Reaming Extension 170
Second Expanding Region 174
First Rounded End 161
Remote End 154 of Second Pivoting Arm 140
Tube 310
Lateral Opening 316
Second End Opening 314
FIG. 6B
Multipurpose Drip Irrigation Tool 110
First Pivoting Arm 120
Second Pivoting Arm 140
First Reaming Extension 160
Second Reaming Extension 170
Second Expanding Region 174
First Expanding Region 164
First End Opening 323
Tube 313
Second End Opening 325
FIG. 6C Multipurpose Drip Irrigation Tool 110
First Pivoting Arm 120
Tube 315
U-shaped Recess 180
Interior Surface 181 of First Handle 122
Second Pivoting Arm 140

Multipurpose Drip Irrigation Tool 110
First Pivoting Arm 120
First Handle 122
Tube 315
U-shaped Recess 180
Interior Surface 179 of Second Handle 142
Second Handle 142
Second Pivoting Arm 140

MULTIPURPOSE DRIP IRRIGATION TOOL

TECHNICAL FIELD

The present invention relates generally to a drip irrigation tool. More specifically, the present invention relates to a multipurpose drip irrigation tool.

BACKGROUND

Drip irrigation systems often require customization. Customization may entail, for example, punching holes in drip irrigation tubes or inserting fittings into openings in the drip irrigation tubes, including openings at the beginning and end of irrigation tubes and openings created on the sides of the tubes. Adding the fittings to a drip irrigation system and punching holes in the irrigation tubing can require significant hand strength and be frustrating for both consumers and professionals. Therefore, providing an improved multipurpose drip irrigation tool is desirable.

SUMMARY

Embodiments of the disclosed subject matter are provided in this summary for illustrative purposes and are in no way limiting of the claimed subject matter. Various sets of embodiments are disclosed in the summary. Those skilled in the art will appreciate that one or more aspects of one set of embodiments may be incorporated into and utilized with other embodiments disclosed in the summary and detailed description.

A first embodiment of a multipurpose drip irrigation tool is disclosed. The first embodiment of the multipurpose drip irrigation tool may comprise a longitudinal dimension, a first pivoting arm, and a second pivoting arm.

The first pivoting arm may comprise a first handle, a first jaw portion and a first pivot region disposed intermediate the first handle and the first jaw portion along a first pivoting arm longitudinal axis.

The second pivoting arm may comprise a second handle, a second jaw portion and a second pivot region disposed intermediate the second handle and the second jaw portion along a second pivoting arm longitudinal axis. The first pivoting arm is pivotally engaged with the second pivoting arm.

The first embodiment of the multipurpose drip irrigation tool may comprise a first reaming extension having a first rounded end, a first expanding region and a first reaming extension longitudinal axis.

The first embodiment of the multipurpose drip irrigation tool may comprise a second reaming extension having a second rounded end, a second expanding region and a second reaming extension longitudinal axis. The first reaming extension longitudinal axis and the second reaming extension longitudinal axis may be substantially parallel. The first rounded end and the second rounded end may be generally aligned along the longitudinal dimension. The first reaming extension and the second reaming extension may be separated by an intervening space.

The first embodiment of the multipurpose drip irrigation tool may further comprise a U-shaped recess disposed on an interior surface of one of the first handle and the second handle such that when the first handle is pivoted towards the second handle, an interior surface of the other one of the first handle and the second handle retains a tube within the U-shaped recess.

Within the first embodiment of the multipurpose drip irrigation tool, the first reaming extension may be positioned with respect to the second reaming extension such that a tube of a first size may be expanded by at least one of the first reaming extension and the second reaming extension and a tube of a second greater size may be expanded by a combination of the first reaming extension and the second reaming extension, the first reaming extension and the second reaming extension both being disposed on a remote end of at least one of the first pivoting arm and the second pivoting arm.

The first embodiment of the multipurpose drip irrigation tool may further comprise a pivot point at which the first pivoting arm and the second pivoting arm pivot with respect to one another. A barbed recess disposed on one of the first jaw portion and the second jaw portion. The barbed recess may comprise a first retaining extension, a first partial frustoconical recess, and a second partial frustoconical recess. The first partial frustoconical recess and the second partial frustoconical recess may be disposed intermediate the first retaining extension and the pivot point along the longitudinal dimension when the multipurpose drip irrigation tool is in a closed position. A second retaining extension, a first retaining recess, and a second retaining recess may be disposed on one of the first jaw portion and the second jaw portion. The first retaining recess and the second retaining recess may be disposed intermediate the second retaining extension and the pivot point along the longitudinal dimension when the multipurpose drip irrigation tool is in a closed position.

Within the first embodiment of the multipurpose drip irrigation tool, when the multipurpose drip irrigation tool is in a closed position and a fitting is disposed between the first jaw portion and the second jaw portion, the first retaining extension and the second retaining extension may engage and surround a first portion of the fitting, the first retaining recess and the first partial frustoconical recess may engage and surround a second portion of the fitting, and the second retaining recess and the second partial frustoconical recess may engage and surround a third portion of the fitting.

Within the first embodiment of the multipurpose drip irrigation tool, the first portion of the fitting may comprise a neck, the second portion of the fitting may comprise a first frustoconical protrusion, and the third portion of the fitting comprises a second frustoconical protrusion.

Within the first embodiment of the multipurpose drip irrigation tool, the first pivoting arm may pivotally engage with the second pivoting arm by a shaft engaged with each of the first pivot region and the second pivot region.

Within the first embodiment of the multipurpose drip irrigation tool, the first rounded end may comprise a first planar portion and the second rounded end may comprise a second planar portion.

Within the first embodiment of the multipurpose drip irrigation tool, one of the first jaw portion and the second jaw portion may comprise a piercing member for engaging with a tube and creating an opening within the tube when the first jaw portion is pivoted towards the second jaw portion. The piercing member may comprise a piercing end and a remote end. The piercing end may comprise a cylindrical region and a frustoconical region with the frustoconical region being disposed intermediate the cylindrical region and the remote end.

A second embodiment of a multipurpose drip irrigation tool may comprise a longitudinal dimension.

The second embodiment of the multipurpose drip irrigation tool may further comprise a first pivoting arm and a second pivoting arm. The first pivoting arm may comprise a first handle, a first jaw portion and a first pivot region disposed intermediate the first handle and the first jaw portion along a first pivoting arm longitudinal axis.

The second pivoting arm may comprise a second handle, a second jaw portion and a second pivot region disposed intermediate the second handle and the second jaw portion along a second pivoting arm longitudinal axis. The first pivoting arm is pivotally engaged with the second pivoting arm.

The second embodiment may further comprise a first reaming extension having a first rounded end, a first expanding region and a first reaming extension longitudinal axis.

The second embodiment of the multipurpose drip irrigation tool may further comprise a second reaming extension having a second rounded end, a second expanding region and a second reaming extension longitudinal axis. The first reaming extension longitudinal axis and the second reaming extension longitudinal axis may be substantially parallel. The first rounded end and the second rounded end may be generally aligned along the longitudinal dimension. The first reaming extension and the second reaming extension may be separated by an intervening space.

The second embodiment may further comprise a pivot point at which the first pivoting arm and the second pivoting arm pivot with respect to one another. A barbed recess may be disposed on one of the first jaw portion and the second jaw portion. The barbed recess may comprise a first retaining extension, a first partial frustoconical recess, and a second partial frustoconical recess. The first partial frustoconical recess and the second partial frustoconical recess may be disposed intermediate the first retaining extension and the pivot point along the longitudinal dimension when the multipurpose drip irrigation tool is in a closed position.

The second embodiment may further comprise a second retaining extension, a first retaining recess, and a second retaining recess disposed on the other one of the first jaw portion and the second jaw portion. The first retaining recess and the second retaining recess may be disposed intermediate the second retaining extension and the pivot point along the longitudinal dimension when the multipurpose drip irrigation tool is in a closed position.

When the second embodiment of the multipurpose drip irrigation tool is in a closed position and a fitting is disposed between the first jaw portion and the second jaw portion, the first retaining extension and the second retaining extension may engage and surround a first portion of the fitting, the first retaining recess and the first partial frustoconical recess may engage and surround a second portion of the fitting, and the second retaining recess and the second partial frustoconical recess may engage and surround a third portion of the fitting. The first portion of the fitting may comprise a neck, the second portion of the fitting may comprise a first frustoconical protrusion, and the third portion of the fitting may comprise a second frustoconical protrusion.

The second embodiment may further comprise a U-shaped recess disposed on an interior surface of one of the first handle and the second handle such that when the first handle is pivoted towards the second handle, an interior surface of the other one of the first handle and the second handle retains a tube within the U-shaped recess.

Within the second embodiment, the first rounded end may comprise a first planar portion and the second rounded end may comprise a second planar portion.

Within the second embodiment, one of the first jaw portion and the second jaw portion may comprise a piercing member for engaging with a tube and creating an opening within the tube when the first jaw portion is pivoted towards the second jaw portion. The piercing member may comprise a piercing end and a remote end. The piercing end may comprise a cylindrical region and a frustoconical region. The frustoconical region may be disposed intermediate the cylindrical region and the remote end.

BRIEF DESCRIPTION OF THE DRAWINGS

Illustrative embodiments of the invention will become more fully apparent from the following description and appended claims, taken in conjunction with the accompanying drawings. Understanding that these drawings depict only illustrative embodiments and are, therefore, not to be considered limiting of the invention's scope, the illustrative embodiments of the invention will be described with additional specificity and detail through use of the accompanying drawings in which:

FIG. 6A is a top perspective view of the embodiment of the multipurpose drip irrigation tool illustrated in FIG. 1 shown with a tube;

FIG. 6B is a top perspective view of the embodiment of the multipurpose drip irrigation tool illustrated in FIG. 1 shown with a tube positioned on a second reaming extension;

FIG. 6C is a top perspective view of the embodiment of the multipurpose drip irrigation tool illustrated in FIG. 1 shown with a larger-diameter tube positioned on both a first reaming extension and a second reaming extension;

DETAILED DESCRIPTION

Figure 1:
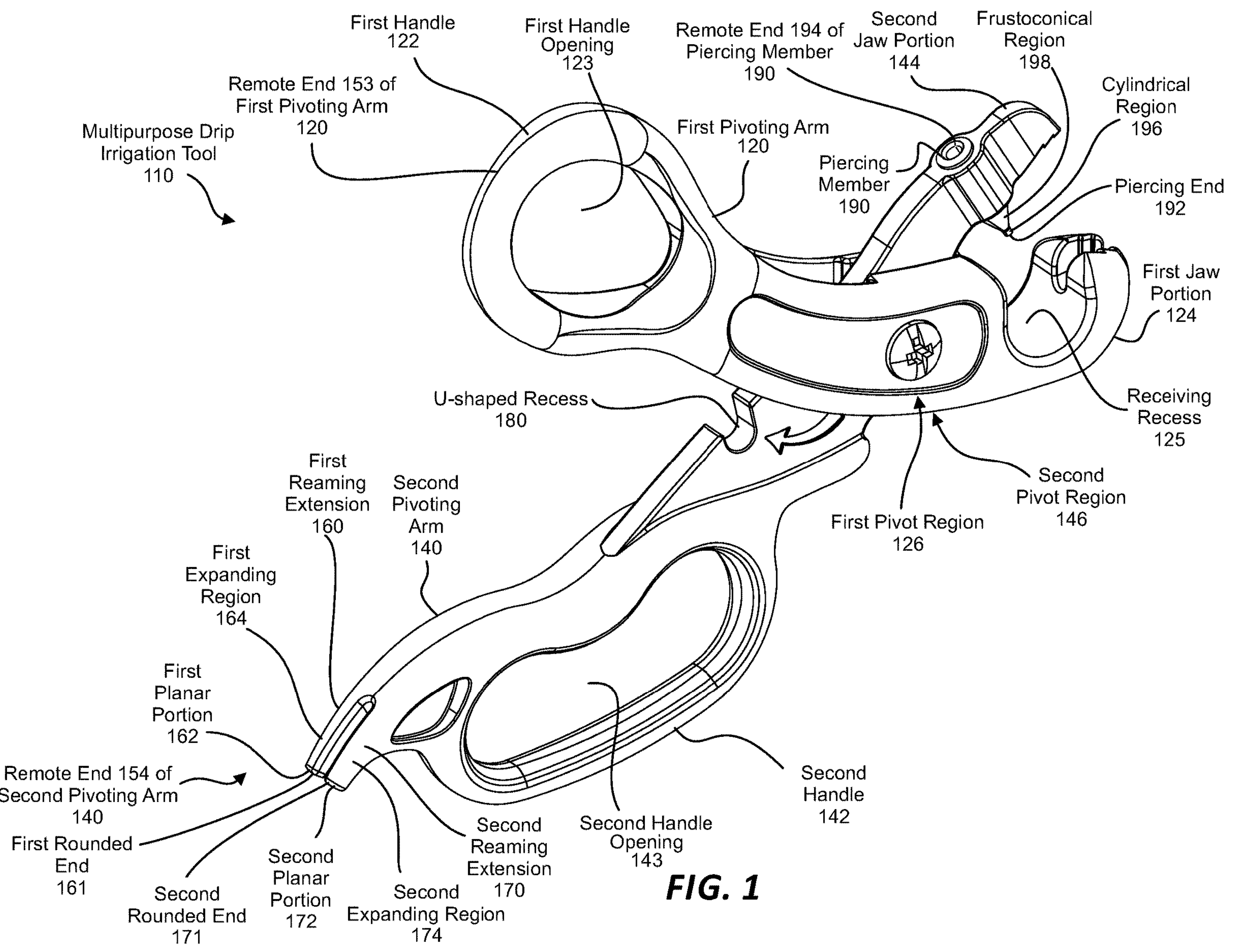
FIG. 1 is a top perspective view of one embodiment of a multipurpose drip irrigation tool.

Various aspects of the present disclosure are described below. It should be apparent that the teachings herein may be embodied in a wide variety of forms and that any specific structure, function, or both disclosed herein is merely representative. Based on the teachings herein, one skilled in the art should appreciate that an aspect disclosed herein may be implemented independently of any other aspects and that two or more of these aspects may be combined in various ways, even if that combination is not specifically illustrated in the figures or identified in the description. For example, an apparatus may be implemented, or a method may be practiced, using any number of the aspects set forth herein whether disclosed in connection with a method or an apparatus. Further, the disclosed apparatuses and methods may be practiced using structures or functionality known to one of skill in the art at the time this application was filed, although not specifically disclosed within the application.

General Definitions

By way of introduction, the following brief definitions are provided for various terms that may be used in this application. Additional definitions may be provided in the context of the discussion of the figures herein. As used herein, "exemplary" can indicate an example, an implementation, and/or an aspect of the disclosed subject matter and does not signify a preferred implementation.

Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") when used to modify an element (such as a structure, a component, an operation, etc.) does not indicate priority or order of the element with respect to another element, but rather distinguishes the element from another element having a same name (but for use of the ordinal term) unless otherwise expressly indicated.

In addition, as used herein, indefinite articles ("a" and "an") can indicate "one or more" rather than "one."

As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited.

As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter.

An enumerated listing of items recited in connection with an embodiment of the invention does not imply that any or all of the items are mutually exclusive and/or mutually inclusive of one another unless expressly specified otherwise.

Within this application, the phrases "secured to," "connected to," "coupled to," and "in communication with" refer to any form of interaction between two or more entities, including mechanical, electrical, magnetic, electromagnetic, and thermal interaction and may also include fluid communication. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abut" refers to items that are in direct physical contact with each other, although the items may be attached, secured, fused, or welded together.

The term "integrally formed" refers to items that are manufactured integrally, i.e., as a single piece, without requiring the assembly of multiple pieces. Multiple parts may be integrally formed with each other if they are formed from a single workpiece. The term "separately manufactured" signifies that two identified items are not integrally formed (e.g., either by different manufacturing processes, or by the same manufacturing process at different times and/or locations).

As used herein, the term "substantially coaxially aligned" signifies that two items are aligned such that the items share a common, imaginary axis (or are within 15° of sharing the same common, imaginary axis) extending through both of the items, although the items may be spaced apart along that common, imaginary axis.

In various embodiments, the term "offset and substantially coaxially aligned" signifies that two items are aligned such that they share a common, imaginary axis (or are within 15° of sharing the same common, imaginary axis) extending through both of the items and the center points of the items along the common, imaginary axis are spaced apart along the common, imaginary axis.

In various embodiments, "overlapping and substantially coaxially aligned" signifies that two items are aligned such that they share a common, imaginary axis (or are within 15° of sharing the same common, imaginary axis) extending through both of the items and the items overlap along the common, imaginary axis.

In various embodiments, "coextensive and substantially coaxially aligned" signifies that two items are aligned such that they share a common, imaginary axis (or are within 15° of sharing the same common, imaginary axis) extending through both of the items and the items are coextensive along the common, imaginary axis.

As used herein, the term "substantially" indicates that a particular value is within 15% of a specified value. For example, the phrase "substantially parallel," as used herein, signifies that the pertinent members, components, or items that are "substantially parallel" to each other are within 15° of being perfectly parallel to each other.

As used herein, in various embodiments, the term "center point nonalignment" when used to identify a relative position of items, features or components along a designated axis signifies that the center points of each of the two identified items are not aligned along a designated axis.

In various embodiments, the term "outer boundary nonalignment" may be used to signify that the outer boundaries of two items do not overlap along a designated axis. The term "nonaligned positions" indicates that two items are not aligned along at least one axis and may refer, for example, to either center point nonalignment or outer boundary nonalignment.

Different embodiments disclosed herein will be assigned reference numerals chosen from groups of one hundred. For example, a first embodiment may include numbers within the range 100-199, and a second embodiment may include numbers within the range 200-299. Similar parts in the different embodiments include analogous numbers. For example, a component in a first embodiment may be assigned reference numeral 121, while a similar component in the second embodiment may be assigned reference numeral 221.

In the figures, certain components may appear many times within a particular drawing. However, only certain instances of the components may be identified in the figures to avoid the undue proliferation of reference numbers and lead lines. According to the context provided in the description while referring to the figures, reference may be made to a specific one of that particular component or multiple instances, even if the specifically referenced instance or instances of the component are not identified by a reference number and lead line in the figures.

The figures will be discussed in the groups outlined below unless otherwise noted. To avoid the undue proliferation of reference numerals and part names, a particular part name and reference numeral will be included at least once in each group but may not appear in all figures within the group. In addition, once a reference numeral and part name has been introduced within a particular group of figures, it may be discussed in subsequent groups of figures although not identified within the currently discussed group of figures.

FIGS. 1-4D

Figure 2:
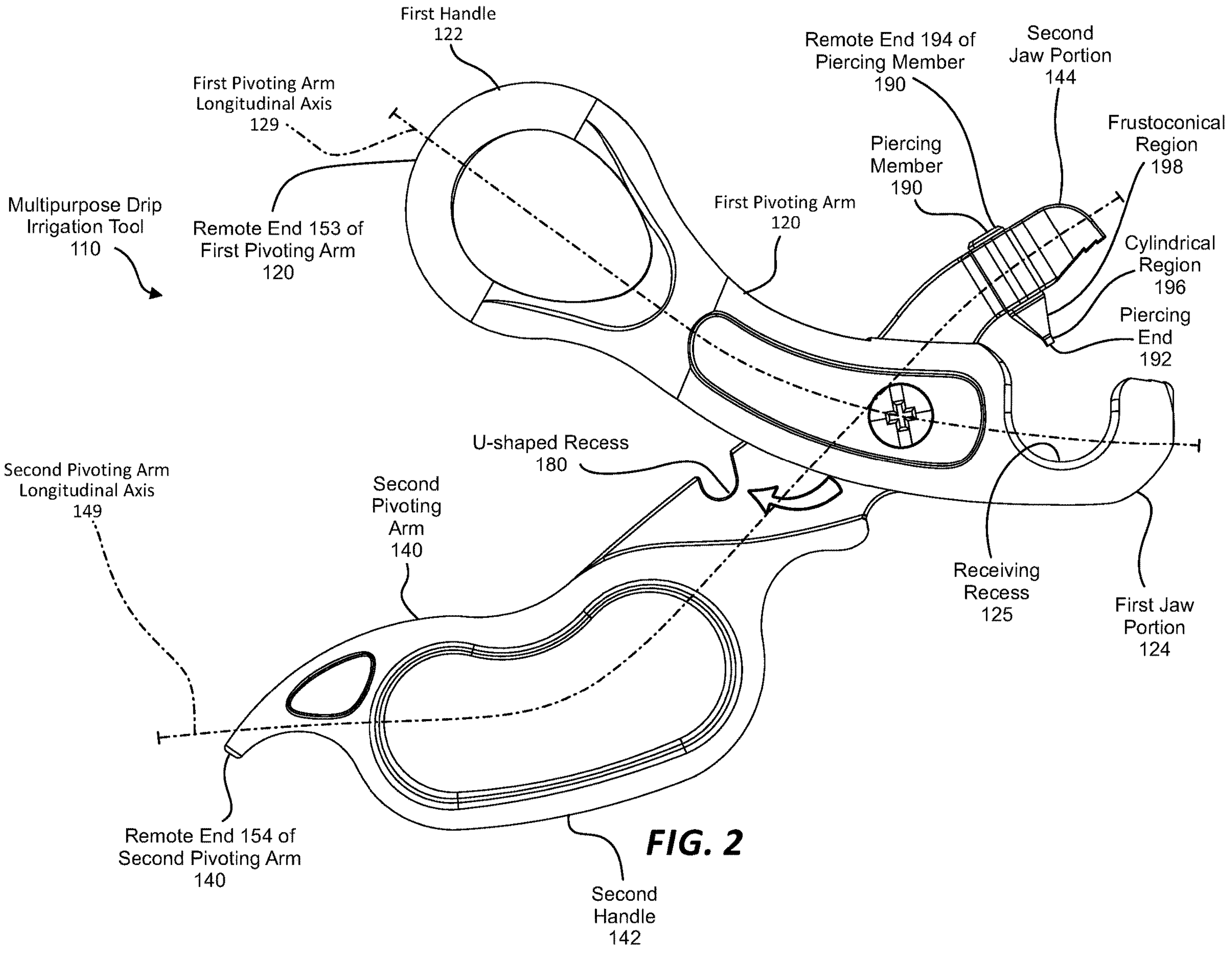
FIG. 2 is a side view of the embodiment of the multipurpose drip irrigation tool illustrated in FIG. 1.
Figure 3:
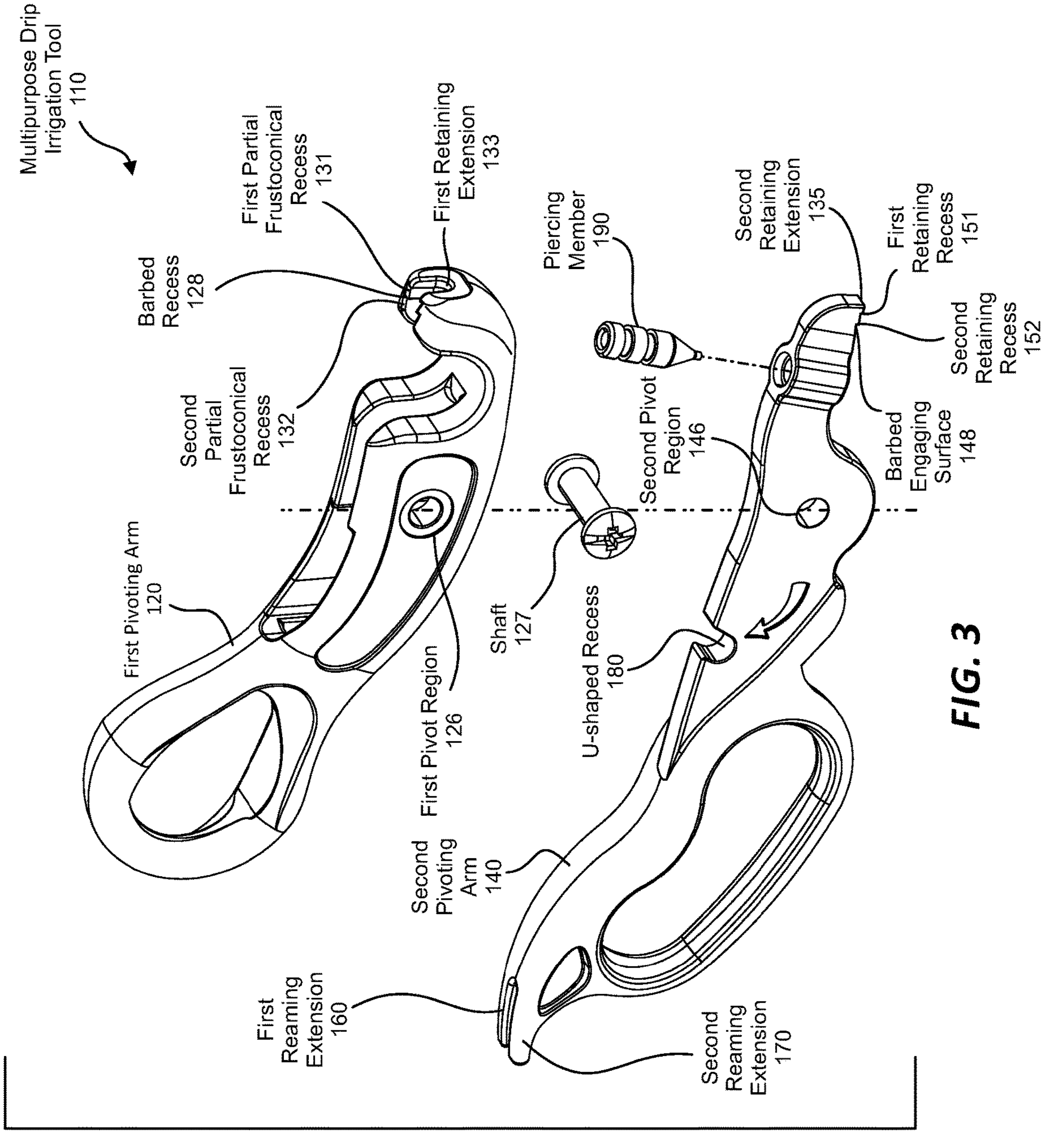
FIG. 3 is an exploded view of the embodiment of the multipurpose drip irrigation tool illustrated in FIG. 1.
Figures 4A, 4B, 4C, 4D:
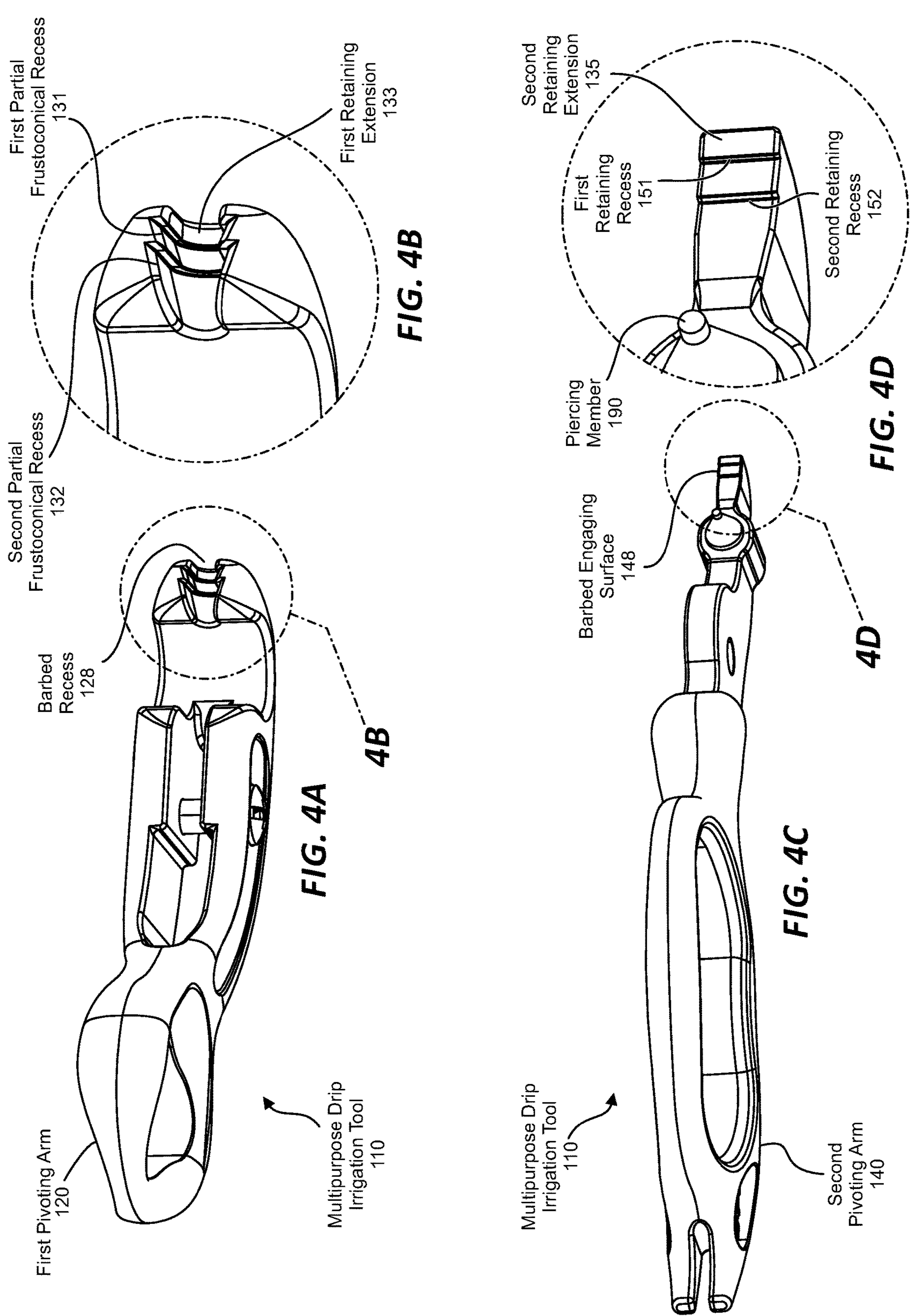
FIG. 4A is a top perspective view of a first pivoting arm of the embodiment of the multipurpose drip irrigation tool shown in FIG. 1.
FIG. 4B is an enlarged view of region 4B of FIG. 4A.
FIG. 4C is a bottom perspective view of a second pivoting arm of the embodiment of the multipurpose drip irrigation tool shown in FIG. 1.
FIG. 4D is an enlarged view of region 4D of FIG. 4C.

Referring to FIGS. 1-4D, the illustrated multipurpose drip irrigation tool 110 may include a first pivoting arm 120 and a second pivoting arm 140. The first pivoting arm 120 may include a first handle 122, a first jaw portion 124, and a first pivot region 126 disposed intermediate the first handle 122 and the first jaw portion 124 along a first pivoting arm longitudinal axis 129. The second pivoting arm 140 may include a second handle 142, a second jaw portion 144, and a second pivot region 146 disposed intermediate the second handle 142 and the second jaw portion 144 along a second pivoting arm longitudinal axis 149. As indicated in FIG. 2, the first pivoting arm longitudinal axis 129 and the second pivoting arm longitudinal axis 149 may not necessarily be linear if the first pivoting arm 120 and the second pivoting arm 140 are nonlinear, as illustrated in FIG. 2. The first pivoting arm 120 and the second pivoting arm 140 may be made, for example, of various types of plastics, such as acrylonitrile butadiene styrene (ABS) or 30% glass-filled nylon.

The first pivoting arm 120 may pivotally engage with the second pivoting arm 140 utilizing, for example, a shaft 127 disposed within the first pivot region 126 and the second pivot region 146. The shaft 127 may comprise, for example, a binding post (best illustrated in FIG. 3). The shaft 127 may be made, for example, of aluminum. The first pivot region 126 and the second pivot region 146 may comprise, for example, openings, as illustrated in the figures. The pivoting engagement illustrated in the figures is merely illustrative. In alternative embodiments, the first pivoting arm 120 may pivotally engage with the second pivoting arm 140 utilizing non-illustrated forms of pivoting engagement.

The first handle 122 may comprise a first handle opening 123, and the second handle 142 may comprise a second handle opening 143 for receiving one or more fingers and/or a thumb of a user to facilitate relative pivoting of the first and second pivoting arms 120, 140.

Moving the first handle 122 and the second handle 142 (pivoting about the shaft 127) towards each other will also cause the first jaw portion 124 and the second jaw portion 144 to move towards each other as well. The position of the first pivot region 126 along the first pivoting arm longitudinal axis 129 and the position of the second pivot region 146 along the second pivoting arm longitudinal axis 149 will affect the leverage or force applied to the motion of the first jaw portion 124 and second jaw portion 144 towards each other when the first handle 122 is pivoted toward the second handle 142.

The multipurpose drip irrigation tool 110 may further comprise a first reaming extension 160 and a second reaming extension 170. The first reaming extension 160 may comprise a first rounded end 161 and a first expanding region 164. The first rounded end 161 may, in certain embodiments, include a first planar portion 162. The second reaming extension 170 may comprise a second rounded end 171 and a second expanding region 174. The second rounded end 171 may, in certain embodiments, include a second planar portion 172. The reaming extensions 160, 170 may individually be used to ream or expand a first diameter tube and be jointly utilized to expand a tube of a second, larger diameter. As illustrated, the first and second reaming extensions 160, 170 may be disposed on a remote end 154 of the second pivoting arm 140 although these reaming extensions 160, 170 could alternatively be disposed on a remote end 153 of the first pivoting arm 120.

The multipurpose drip irrigation tool 110 may also include a U-shaped recess 180 for securely retaining a tube within the U-shaped recess 180. The U-shaped recess 180 will be discussed in additional detail below.

The multipurpose drip irrigation tool 110 and, more specifically, the second jaw portion 144 may also comprise a piercing member 190. The piercing member 190 could be made, for example, of steel or hardened steel. The piercing member 190 may comprise a remote end 194 and a piercing end 192. The piercing end 192 may comprise a cylindrical region 196. A frustoconical region 198 may be disposed intermediate the cylindrical region 196 and the remote end 194. The first pivoting arm 120 may comprise a receiving recess 125 for receiving a tube to be pierced by the piercing member 190.

The first jaw portion 124 may comprise a barbed recess 128 having a first partial frustoconical recess 131, a second partial frustoconical recess 132, and a first retaining extension 133. The second jaw portion 144 may comprise a barbed engaging surface 148 having a second retaining extension 135, a first retaining recess 151 and a second retaining recess 152. The second retaining extension 135, the first retaining recess 151 and the second retaining recess 152 may involve a number of planar surfaces, as illustrated in the figures, or could involve curved surfaces depending, for example, on the shape of a fitting to be engaged within the barbed recess 128 and the barbed engaging surface 148. The barbed recess 128 and barbed engaging surface 148 are used to grasp a barbed member of a fitting, both for purposes of extraction and insertion of a fitting, and will be discussed in further detail below.

FIGS. 5A-5E

Referring now to FIGS. 5A-5E, the first jaw portion 124 may comprise a barbed recess 128. The barbed recess 128 may comprise a first partial frustoconical recess 131, a second partial frustoconical recess 132 and a first retaining extension 133. The second jaw portion 144 may comprise a barbed engaging surface 148. The barbed engaging surface 148 may comprise a first retaining recess 151, a second retaining recess 152 and a second retaining extension 135. Each of the partial frustoconical recesses 131, 132 comprise a partial recess that is in a frustoconical shape (such as one half of a recess in a frustoconical shape), as illustrated in the figures. In various embodiments, the first retaining extension 133 may have a curved shape and the second retaining extension 135 may have a rectangular shape. The retaining recesses 151, 152 may involve a series of planar surfaces (as illustrated in the figures), may involve one or more curved surfaces or may involve a combination of curved and planar surfaces. The barbed recess 128 and the barbed engaging surface 148 may engage with and secure a first barbed member 322 having a first neck 137, a first frustoconical protrusion 324 and a second frustoconical protrusion 326. More specifically, the first jaw portion 124 and the second jaw portion 144 are aligned such that when the first jaw portion 124 pivots toward the second jaw portion 144, the first retaining extension 133 and the second retaining extension 135 surround and engage a first neck 137 of a first barbed member 322 of a fitting 210, the first retaining recess 151 and the first partial frustoconical recess 131 surround and engage a first frustoconical protrusion 324 of the first barbed member 322 of the fitting 210, the second retaining recess 152 and the second partial frustoconical recess 132 surround and engage a second frustoconical protrusion 326 of the first barbed member 322 of the fitting 210. Alternatively, the barbed recess 128 and the barbed engaging surface 148 may engage and surround the second barbed member 342 of the fitting 210, which comprises a second neck 139, a third frustoconical protrusion 344, and a fourth frustoconical protrusion 346. The first retaining extension 133 and the second retaining extension 135 are helpful in retaining the fitting 210 both during the process of extracting and inserting a fitting 210. For example, during insertion, the first retaining extension 133 and the second retaining extension 135 may abut the body 141 of the fitting 210, thus enabling a user to apply greater force during the insertion process. Likewise, during extraction of a fitting 210, the first retaining extension 133 and the second retaining extension 135 provide further support to the first retaining recess 151 and the first partial frustoconical recess 131, enabling greater force to be applied to the fitting 210.

Figures 5A, 5B, 5C:
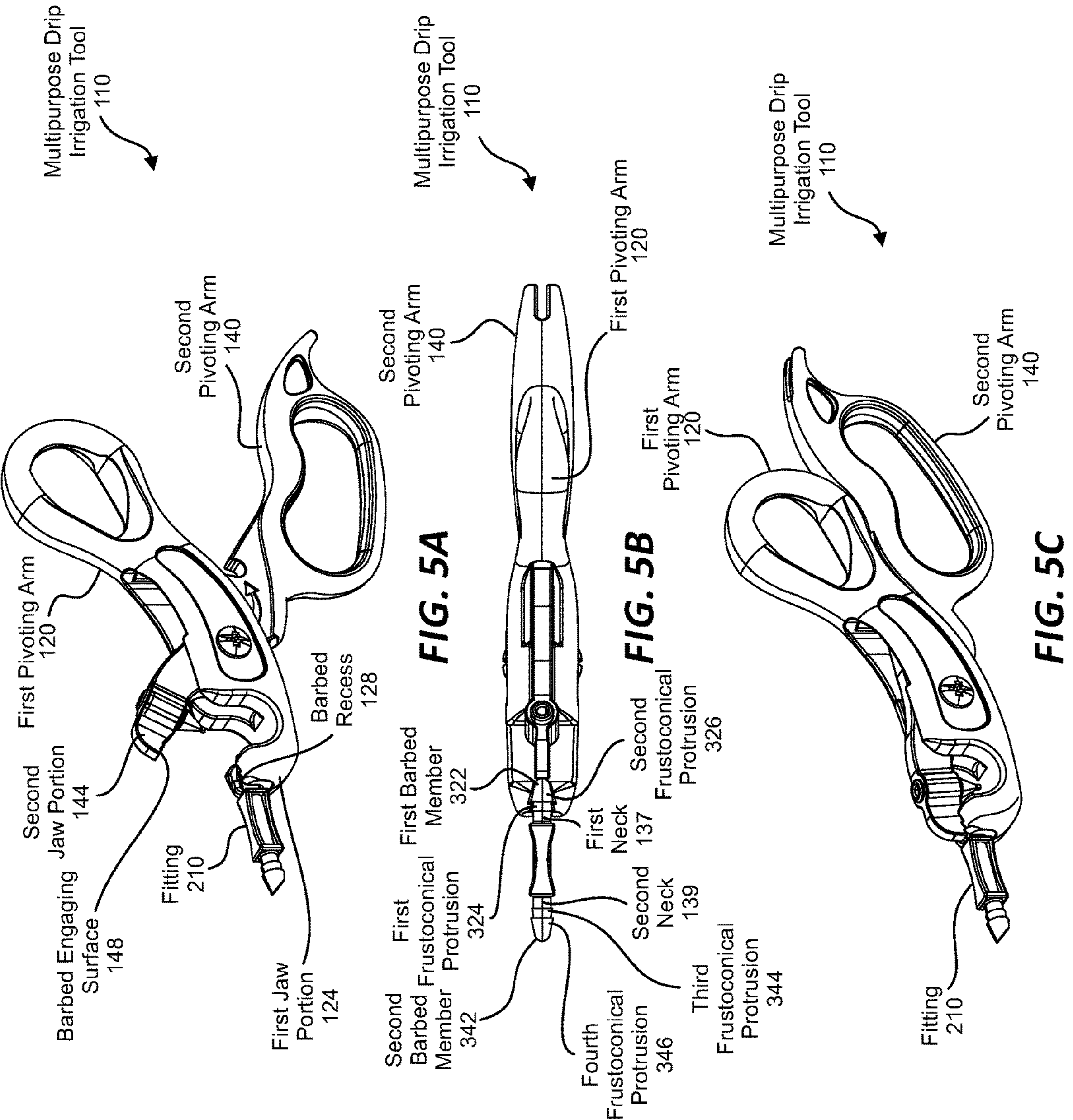
FIG. 5A is a top perspective view of the embodiment of the multipurpose drip irrigation tool illustrated in FIG. 1 in an open position with a fitting positioned within a barbed recess.
FIG. 5B is a top plan view of the embodiment of the multipurpose drip irrigation tool illustrated in FIG. 1 in an open position with a fitting positioned within a barbed recess.
FIG. 5C is a top perspective view of the embodiment of the multipurpose drip irrigation tool illustrated in FIG. 1 in a closed position with a fitting disposed between a barbed recess and a barbed engaging surface.
Figure 5D:
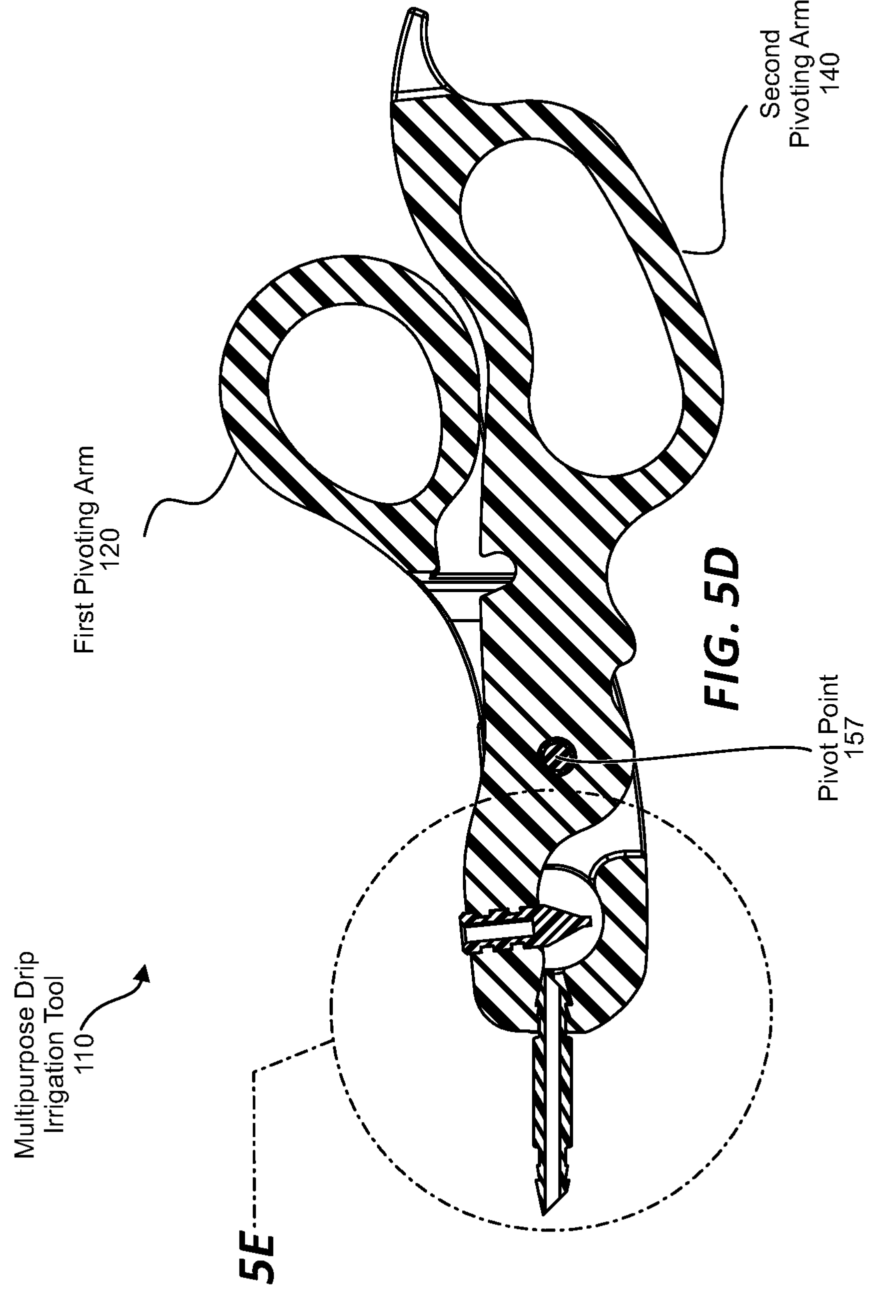
FIG. 5D is a side cross-sectional view of the multipurpose drip irrigation tool illustrated in FIG. 5C shown together with a fitting disposed between a barbed recess and a barbed engaging surface.
Figure 5E:
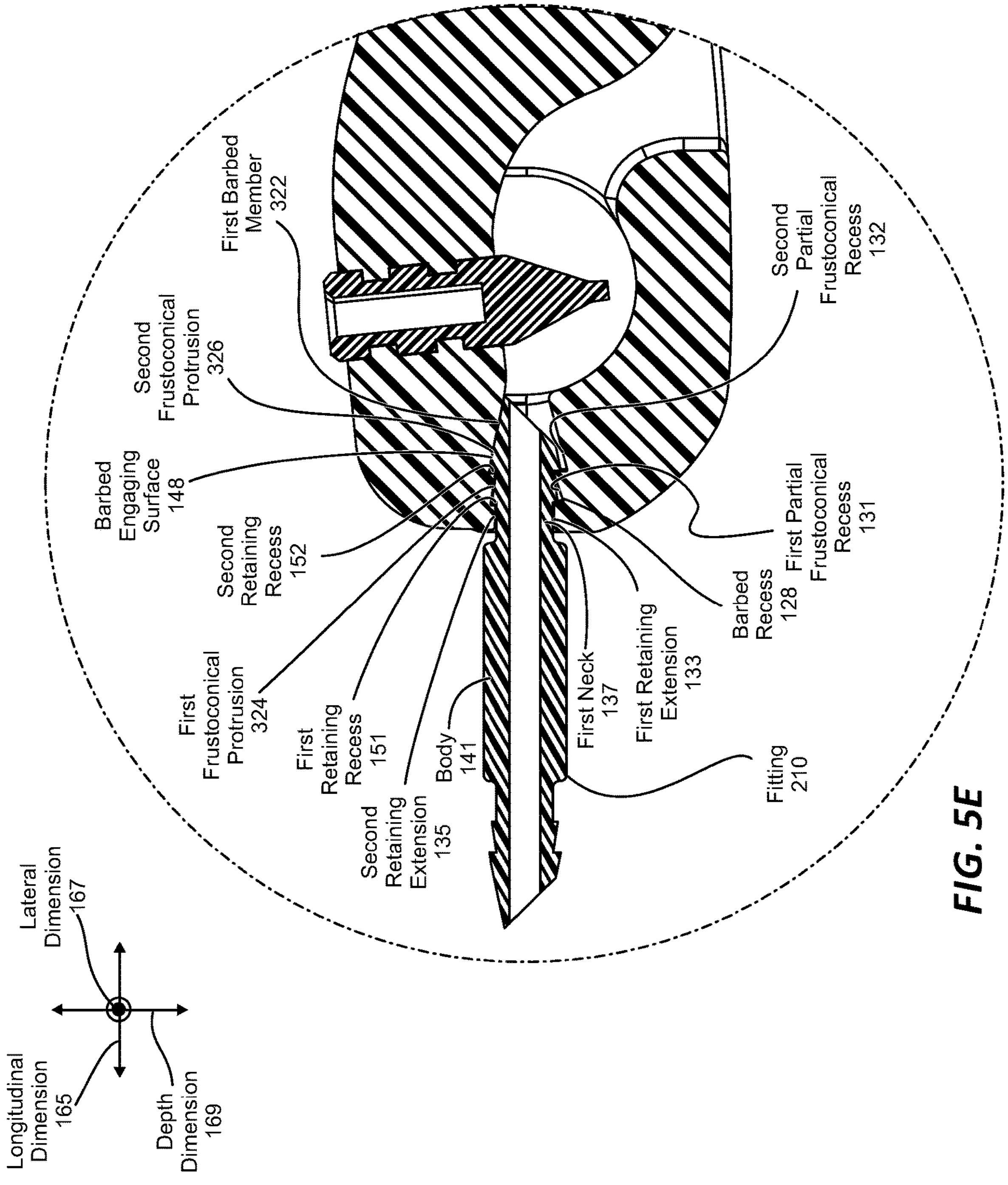
FIG. 5E is an enlarged view of the region 5E shown in FIG. 5D.

The multipurpose drip irrigation tool 110 comprises a longitudinal dimension 165, a lateral dimension 167 and a depth dimension 169. The multipurpose drip irrigation tool 110 may further comprise a pivot point 157 at which the first pivoting arm 120 and the second pivoting arm 140 pivot with respect to one another. As best illustrated in FIG. 5E, the first partial frustoconical recess 131 and the second partial frustoconical recess 132 may be disposed intermediate the first retaining extension 133 and the pivot point 157 along the longitudinal dimension 165 when the multipurpose drip irrigation tool 110 is in a closed position. Also, as best illustrated in FIG. 5E, the first retaining recess 151 and the second retaining recess 152 may be disposed intermediate the second retaining extension 135 and the pivot point 157 along the longitudinal dimension 165 when the multipurpose drip irrigation tool 110 is in a closed position.

It should be noted that the fitting 210 shown in the figures is merely illustrative. For example, the fitting could comprise a T-shaped fitting (having three barbed members), an L-shaped fitting (having two barbed members), a cross-shaped fitting (having four barbed members) or an end cap (having one barbed member). As indicated above, the barbed recess 128 and the barbed engaging surface 148 could engage all or any one of the barbed members of any type of fitting so long as the barbed members are of a size and shape to fit within a combination of the barbed recess 128 and the barbed engaging surface 148.

FIGS. 6A-6C

Referring now to FIGS. 6A-6C, the multipurpose drip irrigation tool 110 comprises a longitudinal dimension 165, a lateral dimension 167 and a depth dimension 169. The second pivoting arm 140 may also comprise a first reaming extension 160 and a second reaming extension 170. The first reaming extension 160 may include a first rounded end 161 (which may include a first planar portion 162) and a first expanding region 164, which increases in size (across the lateral dimension 167 and/or depth dimension 169) moving away from the first rounded end 161. The second reaming extension 170 may include a second rounded end 171 (which may include a second planar portion 172) and a second expanding region 174, which increases in size (across the lateral dimension 167 and/or depth dimension 169) moving away from the second rounded end 171. A first reaming extension longitudinal axis 166 may be substantially parallel with a second reaming extension longitudinal axis 176. The first rounded end 161 and second rounded end 171 may also be generally aligned along the longitudinal dimension 165. The term "generally aligned" indicates that the first rounded end 161 and the second rounded end 171 are within 4 cm (inclusive) of being perfectly aligned along the longitudinal dimension 165. The first reaming extension 160 and the second reaming extension 170 may be separated by an intervening space 163. As illustrated, the intervening space 163 may be empty and may also be elongated along a dimension, such as along the longitudinal dimension 165, the lateral dimension 167 and the depth dimension 169. In various embodiments, the first reaming extension 160 may be positioned with respect to the second reaming extension 170 such that each of the first reaming extension 160 and the second reaming extension 170, in various embodiments, may each be utilized to ream, or expand, a first end opening 312, a second end opening 314, or a lateral opening 316 of a tube 310 of a smaller diameter, such as a tube 310 with quarter-inch outer diameter, as illustrated, for example, in FIGS. 6A-6B. The first reaming extension 160 may also be positioned with respect to the second reaming extension 170 such that a combination of the first reaming extension 160 and the second reaming extension 170 may be utilized to ream, or expand, an opening (such as a first end opening 323 or a second end opening 325 or one or more lateral openings) in a larger diameter tube 313, such as a tube 313 with a half-inch outer diameter, as illustrated, for example, in FIG. 6C. As illustrated, the first reaming extension 160 and second reaming extension 170 may be disposed on a remote end 154 of the second pivoting arm 140. In alternative embodiments, the first reaming extension 160 and the second reaming extension 170 are of different sizes to accommodate tubes 310, 313 of different inner diameters or could be positioned on the first pivoting arm 120. In addition, more than two reaming extensions (such as three or four reaming extensions) may be utilized and aligned in accordance with the foregoing principles to accommodate tubes of different inner diameters.

FIGS. 7A-7B

Figures 7A, 7B:
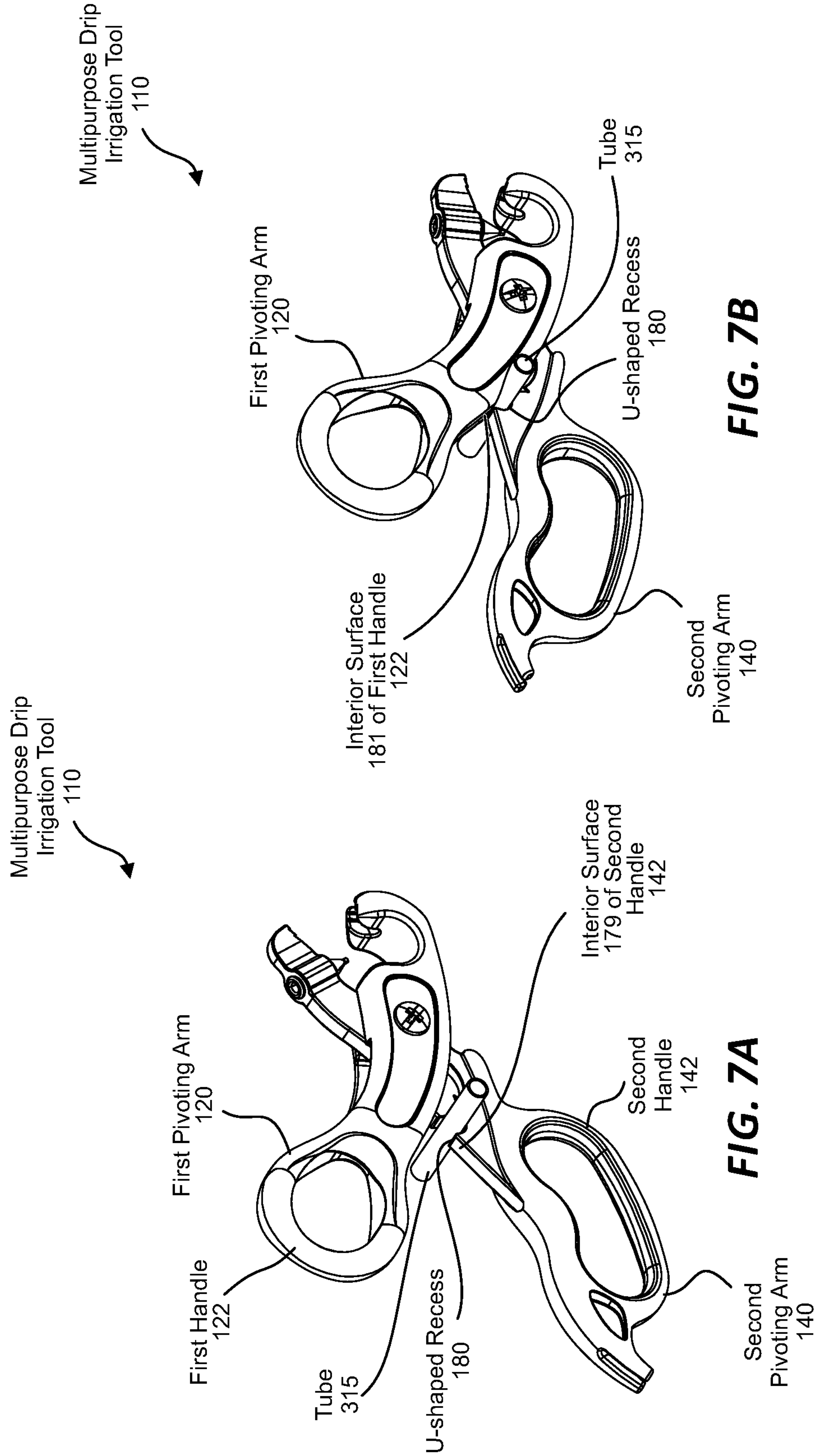
FIG. 7A is a top perspective view of the embodiment of the multipurpose drip irrigation tool illustrated in FIG. 1 in an open position with a tube disposed within a U-shaped recess.
FIG. 7B is a top perspective view of the embodiment of the multipurpose drip irrigation tool illustrated in FIG. 1 in a partially closed position with a tube disposed within a U-shaped recess.

Referring now to FIGS. 7A-7B, the second handle 142 of the multipurpose drip irrigation tool 110 may further comprise a U-shaped recess 180 disposed on the interior surface 179. The U-shaped recess 180 may be used to receive and secure a tube 315. The tube 315 may be secured within the U-shaped recess as the first handle 122 of the first pivoting arm 120 is pivoted towards the second handle 142 of the second pivoting arm 140. More specifically, an interior surface 181 of the first handle 122 may press upon and retain the tube 315 within the U-shaped recess 180. Having a secure grip on a tube 315 utilizing the U-shaped recess 180 may allow a user, for example, to more easily insert a fitting 210 into the secured tube 315. In alternative embodiments, the U-shaped recess 180, could be positioned at different locations on the second handle 142 of the second pivoting arm 140 or could alternatively be positioned on the first handle 122. In various embodiments, which are not illustrated, the multipurpose drip irrigation tool 110 could include multiple U-shaped recesses for receiving tubes 310, 313 of different diameters on one or both of the first handle 122 and second handle 142.

FIGS. 8A-8C

Figures 8A, 8B, 8C:
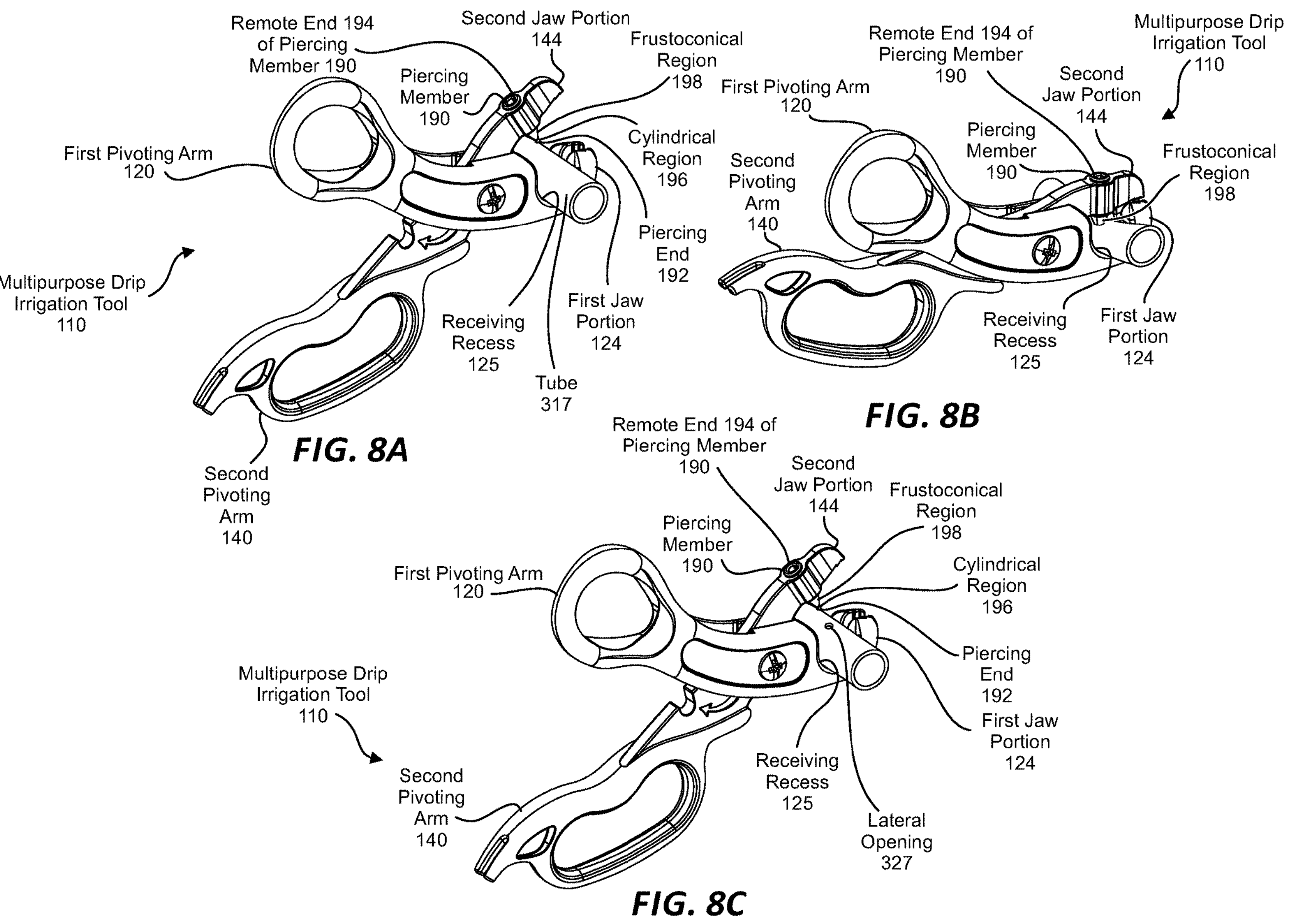
FIG. 8A is a top perspective view of the embodiment of the multipurpose drip irrigation tool illustrated in FIG. 1 in an open position with a tube disposed in a receiving recess.
FIG. 8B is a top perspective view of the embodiment of the multipurpose drip irrigation tool illustrated in FIG. 1 in a closed position with a tube disposed in a receiving recess such that an opening is created in the tube.
FIG. 8C is a top perspective view of the embodiment of the multipurpose drip irrigation tool illustrated in FIG. 1 in an open position with a tube disposed within a receiving recess after an opening has been created in the tube.

Referring now to FIGS. 8A-8C, the second jaw portion 144 of the multipurpose drip irrigation tool 110 may also comprise a piercing member 190. The piercing member may include a piercing end 192 and a remote end 194. In various embodiments, the piercing end 192 may comprise a cylindrical region 196. A frustoconical region 198 may be disposed between the cylindrical region 196 and the remote end 194 of the piercing member 190. The first jaw portion 124 may include a receiving recess 125 for receiving a tube 317 to be pierced. The piercing member 190 enables the creation, for example, of a lateral opening 327 within a tube 317 when the first jaw portion 124 and second jaw portion 144 are pivoted towards each other as a consequence of pivoting the first pivoting arm 120 and the second pivoting arm 140.

Conclusion

As illustrated in the figures, the first and second reaming extensions 160, 170 may be disposed on a remote end 154 of a second pivoting arm 140. In alternative embodiments, the first and second reaming extensions 160, 170 may be disposed on a remote end 153 of the first pivoting arm 120. Also, the first and second reaming extensions 160, 170 could be positioned at locations other than a remote end 153, 154 on the first and second pivoting arms 120, 140.

In addition, as illustrated in the figures, the U-shaped recess 180 is disposed on an interior surface 179 of a second handle 142. In alternative embodiments, the U-shaped recess 180 may be disposed on an interior surface 181 of a first handle 122. In addition, in alternative embodiments, multiple U-shaped recesses of different sizes may be disposed on one or both of the interior surfaces 179, 181 of the first and/or second handles 122, 142.

As illustrated in the figures, the barbed recess 128 may be disposed on the first jaw portion 124 and the barbed engaging surface 148 may be disposed on the second jaw portion 144. In alternative embodiments, the barbed recess 128 may be disposed on the second jaw portion 144 and the barbed engaging surface 148 may be disposed on the first jaw portion 124.

The piercing member 190, as illustrated, comprises a portion of the second jaw portion 144, and a receiving recess 125 is defined by the first jaw portion 124. In alternative embodiments, the piercing member 190 may comprise a portion of the first jaw portion 124 and a receiving recess 125 may be defined by the second jaw portion 144.

In light of the foregoing alternatives, the first phrase "one of" a first item and a second item refers to either one of the first item or the second item. In contrast, the subsequent phrase "the other one" of the first item and the second item refers to either one of the first item or the second item. Therefore, the foregoing technique may be used to express the concept that various components may be at two or more alternate locations within the disclosed and claimed subject matter. As a consequence, the foregoing language "a U-shaped recess disposed on an interior surface of one of the first handle and the second handle such that when the first handle is pivoted towards the second handle, an interior surface of the other one of the first handle on the second handle retains a tube within the U-shaped recess" encompasses at least the following two embodiments (1) the U-shaped recess 180 is disposed on the interior surface 181 of the first handle 122 and an interior surface 179 of the second handle 142 retains a tube 315 within the U-shaped recess 180; and (2) the U-shaped recess 180 is disposed on an interior surface 179 of the second handle 142 and an interior surface 181 of the first handle 122 retains a tube 315 within the U-shaped recess 180.

Various embodiments of the invention may include one or more of the following: a first pivoting arm 120, a second pivoting arm 140, a first reaming extension 160, a second reaming extension 170, one or more U-shaped recesses 180, a barbed recess 128 and/or a barbed engaging surface 148. Therefore, the disclosed subject matter is not limited to any particular aspect disclosed or claimed herein but may broadly encompass variations including one or more of the foregoing items and/or subcomponents thereof.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The invention claimed is:

1. A multipurpose drip irrigation tool comprises a longitudinal dimension, the multipurpose drip irrigation tool further comprising:

a first pivoting arm comprising a first handle, a first jaw portion and a first pivot region disposed intermediate the first handle and the first jaw portion along a first pivoting arm longitudinal axis;

a second pivoting arm comprising a second handle, a second jaw portion and a second pivot region disposed intermediate the second handle and the second jaw portion along a second pivoting arm longitudinal axis, wherein the first pivoting arm is pivotally engaged with the second pivoting arm;

a first reaming extension comprising a first rounded end, a first expanding region and a first reaming extension longitudinal axis;

a second reaming extension comprising a second rounded end, a second expanding region and a second reaming extension longitudinal axis, wherein the first reaming extension longitudinal axis and the second reaming extension longitudinal axis are substantially parallel, wherein the first rounded end and the second rounded end are generally aligned along the longitudinal dimension, wherein the first reaming extension and the second reaming extension are separated by an intervening, elongated, and empty space; and a U-shaped recess disposed on an interior surface of one of the first handle and the second handle such that when the first handle is pivoted towards the second handle, an interior surface of the other one of the first handle and the second handle retains a tube within the U-shaped recess.

2. The multipurpose drip irrigation tool of claim 1, wherein the first reaming extension is positioned with respect to the second reaming extension such that a tube of a first size may be expanded by at least one of the first reaming extension and the second reaming extension and a tube of a second greater size may be expanded by a combination of the first reaming extension and the second reaming extension, the first reaming extension and the second reaming extension both being disposed on a remote end of at least one of the first pivoting arm and the second pivoting arm.

3. The multipurpose drip irrigation tool of claim 1, further comprising:

a pivot point at which the first pivoting arm and the second pivoting arm pivot with respect to one another;

a barbed recess disposed on one of the first jaw portion and the second jaw portion, the barbed recess comprising a first retaining extension, a first partial frustoconical recess, and a second partial frustoconical recess, wherein the first partial frustoconical recess and the second partial frustoconical recess are disposed intermediate the first retaining extension and the pivot point along the longitudinal dimension when the multipurpose drip irrigation tool is in a closed position; and a second retaining extension, a first retaining recess, and a second retaining recess disposed on the other one of the first jaw portion and the second jaw portion, wherein the first retaining recess and the second retaining recess are disposed intermediate the second retaining extension and the pivot point along the longitudinal dimension when the multipurpose drip irrigation tool is in a closed position, wherein, when the multipurpose drip irrigation tool is in a closed position and a fitting is disposed between the first jaw portion and the second jaw portion, the first retaining extension and the second retaining extension engage and surround a first portion of the fitting, the first retaining recess and the first partial frustoconical recess engage and surround a second portion of the fitting, the second retaining recess and the second partial frustoconical recess engage and surround a third portion of the fitting.

4. The multipurpose drip irrigation tool of claim 3, wherein the first portion of the fitting comprises a neck, the second portion of the fitting comprises a first frustoconical protrusion, and the third portion of the fitting comprises a second frustoconical protrusion.

5. The multipurpose drip irrigation tool of claim 3, wherein the first pivoting arm is pivotally engaged with the second pivoting arm by a shaft engaged with each of the first pivot region and the second pivot region.

6. The multipurpose drip irrigation tool of claim 5, wherein the first rounded end comprises a first planar portion and the second rounded end comprises a second planar portion.

7. The multipurpose drip irrigation tool of claim 5, wherein one of the first jaw portion and the second jaw portion comprises a piercing member for engaging with a tube and creating an opening within the tube when the first jaw portion is pivoted towards the second jaw portion, the piercing member comprising a piercing end and a remote end, the piercing end comprising a cylindrical region and a frustoconical region, the frustoconical region being disposed intermediate the cylindrical region and the remote end.

8. A multipurpose drip irrigation tool comprising a longitudinal dimension, the multipurpose drip irrigation tool further comprising:

a first pivoting arm comprising a first handle, a first jaw portion and a first pivot region disposed intermediate the first handle and the first jaw portion along a first pivoting arm longitudinal axis;

a second pivoting arm comprising a second handle, a second jaw portion and a second pivot region disposed intermediate the second handle and the second jaw portion along a second pivoting arm longitudinal axis, wherein the first pivoting arm is pivotally engaged with the second pivoting arm;

a first reaming extension comprising a first rounded end, a first expanding region and a first reaming extension longitudinal axis;

a second reaming extension comprising a second rounded end, a second expanding region and a second reaming extension longitudinal axis, wherein the first reaming extension longitudinal axis and the second reaming extension longitudinal axis are substantially parallel, wherein the first rounded end and the second rounded end are generally aligned along the longitudinal dimension, wherein the first reaming extension and the second reaming extension are separated by an intervening space;

a pivot point at which the first pivoting arm and the second pivoting arm pivot with respect to one another;

a barbed recess disposed on one of the first jaw portion and the second jaw portion, the barbed recess comprising a first retaining extension, a first partial frustoconical recess, and a second partial frustoconical recess, wherein the first partial frustoconical recess and the second partial frustoconical recess are disposed intermediate the first retaining extension and the pivot point along the longitudinal dimension when the multipurpose drip irrigation tool is in a closed position; and a second retaining extension, a first retaining recess, and a second retaining recess disposed on the other one of the first jaw portion and the second jaw portion, wherein the first retaining recess and the second retaining recess are disposed intermediate the second retaining extension and the pivot point along the longitudinal dimension when the multipurpose drip irrigation tool is in a closed position.

9. The multipurpose drip irrigation tool of claim 8, wherein, when the multipurpose drip irrigation tool is in a closed position and a fitting is disposed between the first jaw portion and the second jaw portion, the first retaining extension and the second retaining extension engage and surround a first portion of the fitting, the first retaining recess and the first partial frustoconical recess engage and surround a second portion of the fitting, the second retaining recess and the second partial frustoconical recess engage and surround a third portion of the fitting.

10. The multipurpose drip irrigation tool of claim 9, wherein the first portion of the fitting comprises a neck, the second portion of the fitting comprises a first frustoconical protrusion, and the third portion of the fitting comprises a second frustoconical protrusion.

11. The multipurpose drip irrigation tool of claim 8, further comprising a U-shaped recess disposed on an interior surface of one of the first handle and the second handle such that when the first handle is pivoted towards the second handle, an interior surface of the other one of the first handle and the second handle retains a tube within the U-shaped recess.

12. The multipurpose drip irrigation tool of claim 11, wherein the first rounded end comprises a first planar portion and the second rounded end comprises a second planar portion.

13. The multipurpose drip irrigation tool of claim 12, wherein one of the first jaw portion and the second jaw portion comprises a piercing member for engaging with a tube and creating an opening within the tube when the first jaw portion is pivoted towards the second jaw portion, the piercing member comprising a piercing end and a remote end, the piercing end comprising a cylindrical region and a frustoconical region, the frustoconical region being disposed intermediate the cylindrical region and the remote end.

* * * * *